Figure 1:
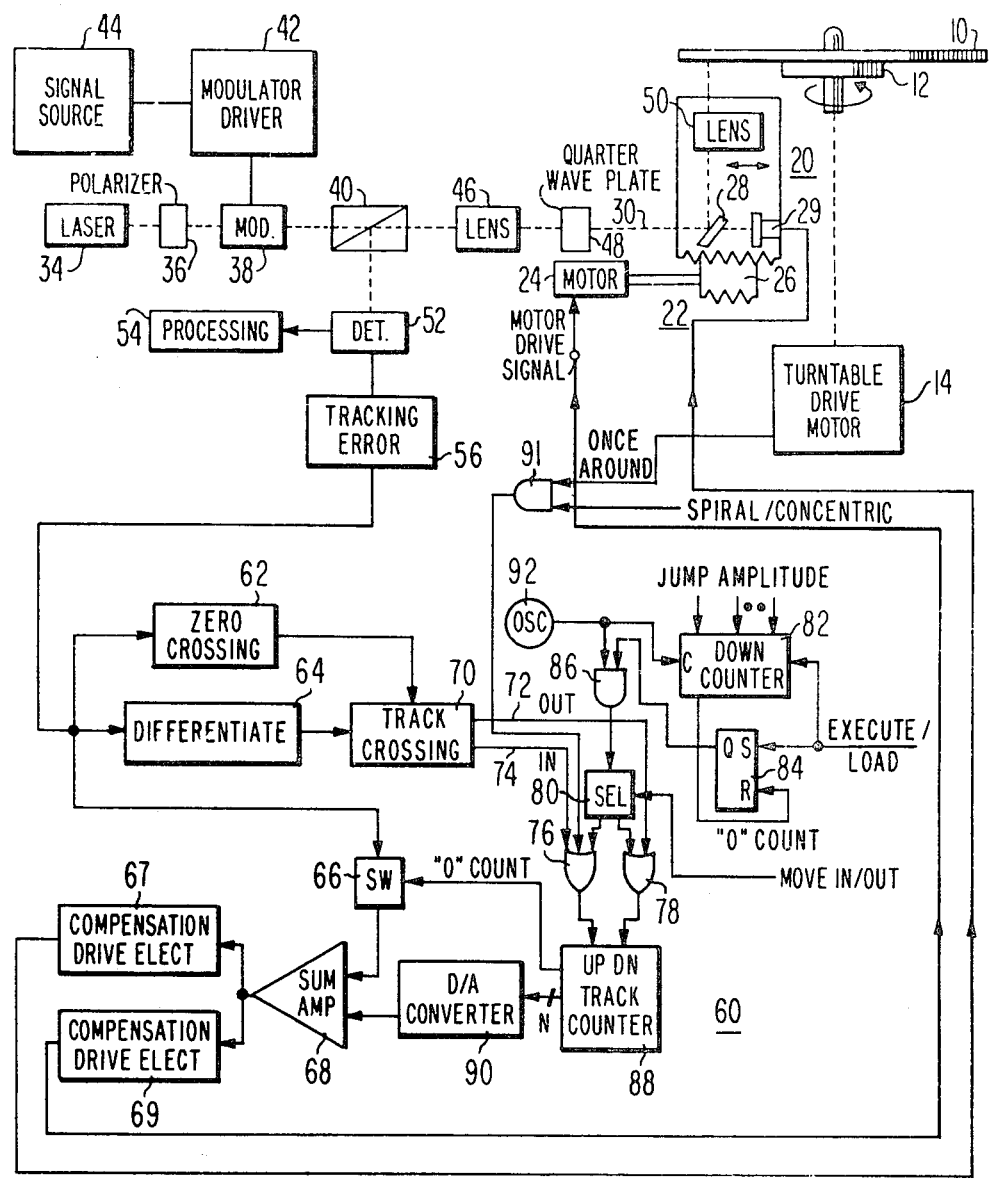

United States Patent [19]
Ammon

[11] 4,443,869
[45] Apr. 17, 1984

[54] TRACK JUMP SERVO SYSTEM FOR DISC PLAYER

[75] Inventor: George J. Ammon, Medford, N.J.

[73] Assignee: RCA Corporation, New York, N.Y.

[21] Appl. No.: 306,356

[22] Filed: Sep. 28, 1981

[51] Int. Cl.³ .......................................... G11B 17/06
[52] U.S. Cl. ...................................... 369/41; 369/33
[58] Field of Search .......................... 369/30, 33, 41

[56] References Cited

U.S. PATENT DOCUMENTS

| | | | |
|---|---|---|---|
| 4,106,058 | 8/1978 | Romeos et al. | 369/33 |
| 4,138,663 | 2/1979 | Lehureau et al. | 369/41 |
| 4,160,270 | 7/1979 | Goldschmidt et al. | 358/128 |
| 4,222,071 | 9/1980 | Bell et al. | 358/128.5 |

FOREIGN PATENT DOCUMENTS 48441 3/1982 European Pat. Off. .............. 369/41

*Primary Examiner*—Steven L. Stephan
*Attorney, Agent, or Firm*—Joseph S. Tripoli; Robert L. Troike; Christopher L. Maginniss

[57] ABSTRACT

An apparatus is provided for randomly accessing data in a data retrieval system which utilizes a disc-shaped record medium. Information is stored in a plurality of tracks on the surface of the record medium. When the readout transducer is to be moved from its present read position (e.g., track #1,000) to a new read position (e.g., track #2,000), the difference in the number of tracks in the new position and the present position is loaded into a counter. As the transducer is moved across the disc surface the number of track crossings is counted and compared to the number loaded into counter. Even though the read head is moving outward, for example, eccentricities in the tracks will cause the head to "see" both "in" and "out" crossings, the number of actual tracks crossed will be equal to the number of "out" crossings minus the number of "in" crossings. When the number of track crossings is equal to the number in the counter, the transducer will be enabled to follow the desired track.

7 Claims, 3 Drawing Figures

TRACK JUMP SERVO SYSTEM FOR DISC PLAYER

The Government has rights in this invention pursuant to Contract No. F30602-79-C-0271 awarded by the Department of Air Force.

This invention relates generally to playback systems used with disc-shaped rotating surfaces and, more particularly, to systems having servos for positioning a transducer means relative to a disc surface.

Prior art information systems rely on the playback of track address data to locate desired prerecorded information. The tracks may be circular when the information is recorded in concentric tracks or may be convolutions of a continuous spiral. The packing density, which is inversely proportional to the track spacing, has been significantly increased in optical systems utilizing a laser as an optical transducer. Further, in an effort to reduce system cost, record media are selected that are cheap to produce. Unfortunately, low cost materials, such as plastic, which are used for the media are not generally dimensionally stable, thus discs made from such materials may vary in shape and may have spindle holes that are not accurately centered. In these prior art systems, the track-to-track spacing is so close (e.g., on the order of one micrometer) and the dimensions vary such that it is impractical to accurately position the transducer by purely mechanical means.

Thus, it has been the practice in the prior art to position the optical head at a point where the data is believed to reside and then lock onto the nearest track by closing the tracking servo. If, after reading the address code for the information stored in the locked-onto track, the transducer is not scanning the desired track, a comparison is made between the locked-onto track and the desired track. After comparing the locked-onto position to the desired position, the optical head is repositioned. This process is repeated until the desired track is located.

In accordance with the principles of the present invention, this iterative track location process is replaced with a rapid, accurate track locating function wherein the desired track is generally located without reading the track address code and without moving the head to a new location. The present invention is based on counting track crossings as the transducer scans the disc surface. After a predetermined number of tracks has been crossed, and the center of the desired track has been reached, the scanning is stopped and the transducer locks onto the desired track.

In accordance with one aspect of the present invention, an apparatus is provided in an information playback system for locating a desired track on the surface of a disc-shaped record medium. The record medium is provided having information stored along a plurality of successive, elongated tracks. A transducer means detects the information stored in the information tracks while the record medium is rotated on a turntable. A track jump signal which represents the number of tracks between a first read position wherein the transducer is detecting information recorded in a first one of the plurality of tracks and a second read position wherein information is stored in a second read position is provided to a counter. The apparatus includes means for providing a first pulse signal when the transducer crosses one of the plurality of tracks in a first direction transverse to an elongated direction of the track and for providing a second pulse signal when the transducer crosses one of the plurality of tracks in a second direction which is opposite to the first direction. Further, the apparatus includes means for establishing radial relative motion between the transducer and the record medium in response to an output of the counter and the first and second pulse signals. When the transducer has traversed the desired number of tracks, which is the difference between the first pulses and the second pulses, it has been relocated from the first read position to the second read position.

Figures 2A, 2B:
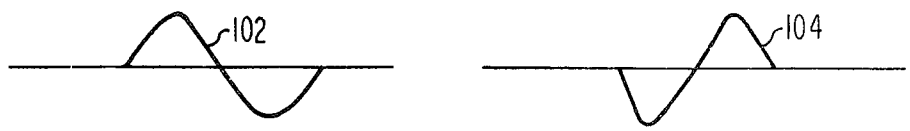

Other features and advantages of the present invention will be more fully understood from the following detailed description of the preferred embodiment, the appended claims and the accompanying drawings, in which:

FIG. 1 shows, via block diagram representation, a playback system embodying the principles of the present invention; and FIGS. 2A and 2B show waveforms of the tracking error signal of the playback system described in FIG. 1.

In accordance with the embodiment of FIG. 1, data are stored on precisely located tracks for rapid retrieval. Recordation is achieved on a light sensitive disc into which data are permanently recorded generally by ablation or melting. The recorded information is available immediately without further processing of any kind.

A disc 10 as illustrated in FIG. 1 is formed having a laser sensitive material providing a surface upon which ablative recording by the thermal effects of a focused laser beam may be made. In the embodiment described herein, the surface should be non-reflective for best results. A preferred disc for ablative recording is disclosed in U.S. Pat. No. 4,222,071 issued on Sept. 9, 1980 to A. E. Bell, et al. Disc 10 may be provided with either or both of two track formats. One format comprises concentric circular tracks while the other format comprises a spiral having successive, spaced-apart track convolutions. In both formats adjacent tracks are closely spaced (e.g. on the order of one micrometer).

To provide optical scanning on the surface of disc 10, optical stage 20 is kept stationary (i.e., for the concentric format) or moved radially (i.e., for the spiral format) across disc 10 by transporting means 22 at a rate in accordance with the requirements of the desired recording or playback mode while disc 10 is rotated on turntable 12 by motor 14. Transporting means 22 comprises conventional components including coarse tracking motor 24 and a feedscrew 26 adapted to be rotated in response to rotations of the shaft of motor 24. Feedscrew 26 is in mesh engagement with a bearing surface of stage 20. When motor 24 is activated and the shaft is rotated, for example, in a clockwise direction, feedscrew 26 will cause stage 20 to move radially inward toward the center axis of turntable 12. Furthermore, if the shaft of motor 24 is made to rotate in a counterclockwise direction, stage 20 will move radially outward. By means of a motor drive signal from compensation drive electronics 69 stage 20 may be moved (i.e., coarse tracking movement) such that light beam 30 falls on the surface of disc 10 to within a few tracks of a desired track location. Fine tracking movements may be achieved by deflecting the light beam exactly to a desired track by a conventional galvanometer controlled mirror 28 which is included within optical stage 20. Galvanometer 29 causes galvanometer controlled mirror 28 to move about an axis that is parallel to the surface of mirror 28 for deflecting impinging light beam 30 onto the surface of disc 10 so that a light spot that is formed by lens 50 may be guided along a selected track on disc 10. Mirror 28 is actuated by galvanometer 29 in response to control signals. The control signals to the galvanometer are supplied by compensation drive electronics 67.

In the record mode, the monochromatic light output of laser 34 (illustratively an argon type providing an output wavelength of 488 nanometers) is passed via polarizer 36 and intensity modulator 38 to a polarized beam splitter 40. The polarizer 36 effects a polarization of the laser output in a direction that permits passage of the intensity modulated light through the beam splitter 40. The intensity modulator 38 is driven by a modulator driver 42, responsive to a data stream source of digital information. The data stream source, which may be pulse code modulated, is furnished by signal source 44 to modulator drive 42. The light intensity of the output of modulator 38 is shifted between high and low levels in consonance with the pulse code modulated input signal.

A lens 46 forms the light passed by beam splitter 40 into a beam which passes through quarter-wave plate 48 to galvanometer controlled mirror 28 which reflects the beam through a focusing lens 50 onto the absorptive surface layer of disc 10. The absorptive layer in the path of the focused light beam is ablated to form a pit when the light beam intensity level is high. The absorptive layer remains undisturbed when the light beam intensity level is low. The result is formation of an information track of the general type shown in the aforementioned Bell et al. patent.

In the play mode of operation, variations of the intensity of the laser output is discontinued by a suitable disabling of modulation control system 38, 42, and 44. The intensity of the laser output is set at a constant playback level which is safely below the level causing ablation of the material of the absorptive layer. The laser beam follows the previously described path (via elements 36, 38, 40, 46, 48, and 28) to lens 50 which focuses the beam on the desired information track of disc 10. Light reflected from the information track is returned via elements 50, 28, 48, and 46 to the beam splitter 40. Since the return light beam has made two passes through quarter-wave plate 48, its polarization has been altered to a direction which results in reflection of the return light beam by beam splitter 40 onto photodetector 52.

The intensity of light falling upon the photodetector 52 alternates between minimum and maximum levels as the successive pit and undisturbed surface regions of the information track pass through the path of the focus beam. The minimum intensity level for light reaching photodetector 52 is obtained when an undisturbed region of the absorptive layer of disc 10 is in the focus beam path, while the maximum intensity level for light reaching the photodetector 52 is obtained when a pit is in the focused beam path.

The output of the photodetector comprises pulse code modulated waves which vary in accordance with the pit edge spacing. Variations of the detected beam intensity are representative of the original signal encoded on the disc surface during the recording operation. The photodetector output is applied to processing circuitry 54 for use in suitable processing equipment.

To compensate for disc eccentricity errors during playback, the galvanometer control signal may be dithered such that the light beam makes periodic excursions radially across the disc 10 during signal playback as described in U.S. Pat. No. 4,160,270 issued on July 3, 1979 to A. M. Goldschmidt et al.

In accordance with the present invention, a servo system 60 is provided for making rapid/accurate track jumps to access data in any one of the plurality of track convolutions (either a single turn of a spiral track format or one track in the concentric track format). The output from detector 52 is coupled to tracking error circuit 56. Tracking error circuit 56 is of a type well known in the art and may be, for example, similar to the photoelectric tracking detector described in European Patent Application, Publication No. 048,441, A2, of Koishi et al., filed on Sept. 16, 1981, and published on Mar. 31, 1982. The signal from the tracking error circuit 56 is then supplied to zero crossing detector 62, differentiator circuit 54 and switch 66. In the normal playback mode, switch 66 is closed to permit the signal from detector 52 to pass through summing amplifier 68 to motor 24 and galvanometer 29.

The zero crossing detector 62 and differentiator circuit 64 are coupled to a track crossing circuit 70. The two outputs 72 and 74 of track crossing circuit 70 are coupled to first inputs of OR gates 76 and 78, respectively. The second inputs to OR gates 76 and 78 are provided from selector switch 80. Down counter 82 provides pulses representative of the jump amplitude (i.e., number of tracks to be crossed) via flip-flop 84 and AND gate 86 to selector switch 80.

AND gate 91 is coupled to the third input of OR gate 76. A pulse is delivered from the turntable drive every time the turntable 12 turns 360° (i.e., once-around pulses). The once-around pulses are provided to one input of AND gate 91. The other input of AND gate 91 is used to enable or inhibit the gate depending upon the track format on disc 10. For example, if the disc is recorded having a spiral track format, the spiral/concentric input to gate 91 is high so that gate 91 passes the once-around pulses to OR gate 76. If, on the other hand, disc 10 is recorded having a concentric track format, the spiral/concentric input to gate 91 is low inhibiting the gate.

The outputs from OR gates 76 and 78 are connected to the UP input and DOWN input respectively of UP-/DOWN counter 88. The output from counter 88 is fed via D/A converter 90 to one input of summing amplifier 68.

In operation, a tracking error signal from tracking error circuit 56 provides a waveform indicating whether the transducer moves across a track in an "out" or an "in" radial direction with reference to the center of the disc. Referring to FIGS. 2A and 2B, track error signals of a type from a split detector tracking scheme are shown. When the relative motion between the transducer and track is inward (i.e., the transducer crosses the track from the outside of the disc 10 to the inside) the tracking error signal will have a waveform 102 as shown in FIG. 2A. If, on the other hand, the relative motion is outward, the tracking error signal will have a waveform 104 as shown in FIG. 2B. These signals, which cross through the zero reference level when the light spot is centered on a track of signal pits, have a slope at the zero crossing which may be used to determine the direction of crossing.

For normal tracking functions the track error signal is fed via switch 66 to summing amplifier 68. The track error signal is then passed via compensation drive electronics 67 and 69 to stage motor 24 and galvanometer 29. If the light beam strays off of the track being read the error signals compensate to maintain the light beam centered on the track.

In accordance with the present invention, the track error signal from tracking error circuit 56 is supplied to zero crossing detector 62 and differentiator circuit 64. The differentiator measures the slope of the signal to determine whether the relative motion is "in" or "out" and the zero crossing detector provides an output pulse when the center of the track is reached. The output pulse signal is used to strobe the track crossing circuit 70 to determine the relative spot-to-track velocity at crossing, Thus, the track crossing circuit 70 generates an "out" pulse when the transducer crosses a track in the outward direction and an "in" pulse when it crosses a track in the inward direction.

For an explanation of the operation of the track jump servo consider the following example for a disc having concentric tracks. The player is reading data on track #1,000 and it is desired to access track #2,000 (a radial jump outward of 1,000 tracks). The number 1,000 is loaded into counter 82, the spiral/concentric command is set to inhibit gate 91, switch 66 is opened to open the servo tracking loop and selector switch 80 is set to the "out" state. The execute/load command is then set to enable counter 82 and set flip-flop 84. Pulses from oscillator 92 are simultaneously fed to one input of AND gate 86 and the clock input of counter 82. Counter 82 counts down toward zero while flip flop 82 provides a high Q output to the other input of AND gate 86 enabling the gate. Since the jump is outward the pulses from AND gate 86 are gated into the UP side of track counter 88. When counter 82 reaches zero, flip-flop 84 is reset and the number of pulses provided to the UP side of track counter 88 is equal to the jump amplitude gated into counter 82.

As the track counter 88 counts up, its output is fed to D/A converter 90. The digital output from track counter 88 is converted to an analog switch which is fed via summing amplifier 68 to drive stage 20 to reposition the location that the light beam falls on disc 10. In this example the light beam is moved from track #1,000 to track #2,000. As stage 20 moves, tracks are crossed generating both "out" and "in" pulses. This is so because the eccentricity of the tracks, for example, due to the mechanical characteristics of the disc, will cause the transducer to "see" both inward and outward crossings even though the stage is moving only in one direction with respect to disc 10. The number of actual tracks crossed will be equal to the number of "out" pulses minus the number of "in" pulses. By feeding the "out" pulses to the "down" input of track counter 88 and the "in" pulses to the "up" input, the net number of tracks crossed will be counted. As the light beam moves outward, counter 88 will count down due to the light beam motion and count up due to jump amplitude pulses. The stage 20 is driven to make the net track crossings occur at a rate equal to the rate that pulses are fed to selector switch 80 from AND gate 86. When the pulses from AND gate 86 have reached the number specified in counter 82, the output from AND gate 86 will go low and the stage will continue to cross tracks until the net of the crossings is equal to the jump amplitude. At this point, a zero count command is delivered to switch 66 to cause the servo tracking loop to be closed.

In similar manner, if a jump in the inward direction were commanded, stage 20 would move inward until the number of tracks indicated by the jump amplitude were crossed. After the correct number of tracks were crossed, the optical head would lock onto the desired track.

If the information on disc 10 has been recorded in a spiral format, an "apparent" track crossing will occur for every revolution of the disc due to the relative inward motion of the rotating spiral. To compensate for these "apparent" track crossings, AND gate 91 is enabled when disc 10 has a spiral track format. In accordance with the embodiment of the FIGURE, once-around pulses from the turntable drive are fed to the "up" input of counter 88 via OR gate 76. In this manner, "apparent" track crossings due to the relative motion of the spiral track are compensated for by providing a once-around pulse from the turntable drive for each revolution of disc 10.

The present invention provides a servo system which moves an optical head a given number of tracks regardless of the track-to-track spacing or track eccentricity. It performs this skip function accurately without requiring readout of track address information recorded in the tracks.

What is claimed is:

1. In an information playback system for use with a disc-shaped record medium having information stored along a plurality of successive, elongated tracks, each of said tracks being provided in a single rotation of said record medium, an apparatus comprising:
   transducer means for detecting said information stored in said information tracks;
   means for rotating said record medium;
   means for providing a track jump signal representative of the number of tracks between first and second read positions wherein said first and second read positions correspond to said transducer means reading information recorded in first and second ones of said plurality of tracks respectively;
   means for providing a tracking error signal having a first slope polarity when said transducer crosses over the center of one of said plurality of tracks in a first direction transverse to an elongated direction of said track and having a second slope polarity when said transducer crosses over the center of one of said plurality of tracks in a second direction, said second direction being opposite to said first direction, and said second polarity being opposite to said first polarity;
   means for generating a signal pulse when said tracking error signal crosses a zero reference voltage level;
   differentiator means for providing a signal output indicative of the slope polarity of said tracking error signal;
   and
   means responsive to said means for providing a track jump signal and responsive also to said generating means and said differentiator means for establishing radial relative motion between said transducer and said record medium such that said transducer means is relocated from said first read position to said second read position.

2. The apparatus according to claim 1 wherein said means for establishing radial relative motion includes an up/down counter for up counting said signal pulses generated while said differentiator means signal output indicates said first slope polarity of said tracking error signal and for down counting said signal pulses generated while said differentiator means signal output indicates said second slope polarity of said tracking error signal.

3. In an information playback system for use with a disc-shaped record medium having a plurality of convolutions of a spiral track recorded on the surface thereof, each of said convolutions having predetermined information stored therein, an apparatus comprising:
    transducer means for detecting said information stored in said convolutions;
    means for rotating said record medium;
    means for providing a control signal to reposition said transducer means from a first read position to a second read position, wherein said first and second read positions correspond to said transducer means being positioned to read information recorded in first and second ones of said plurality of convolutions respectively, said control signal being representative of the number of track convolutions between said first read position and said second read position;
    means for providing a tracking error signal having a first slope polarity when said transducer crosses over the center of a track convolution in a first direction transverse to an elongated direction of said track convolution and having a second slope polarity when said transducer crosses over the center of a track in a second direction, said second direction being opposite to said first direction, and said second polarity being opposite to said first polarity;
    means for generating a signal pulse when said tracking error signal crosses a zero reference voltage level;
    differentiator means for providing a signal output indicative of the slope polarity of said tracking error signal; and
    means responsive to said means for providing a control signal and responsive also to said generating means and said differentiator means for establishing radial relative motion between said transducer and said record medium such that said transducer is relocated from said first read position to said second read position.

4. The apparatus according to claim 3 wherein said means for establishing radial relative motion includes a tracking stage which moves said transducer means such that said transducer means scans across said record medium in a radial direction.

5. The apparatus according to claim 4 wherein said transducer means includes a light source providing a focused beam of light incident on the surface of said record medium.

6. In an information retrieval system for use with a disc-shaped record medium having a plurality of convolutions of a spiral track recorded on a surface thereof, each of said convolutions having recorded information stored therein, an apparatus comprising:
    means for rotating said record medium;
    a light source for providing a focused beam of light incident on said surface of said record medium;
    means for detecting an occurrence of said light beam traversing one of said plurality of convolutions;
    means for providing a tracking error signal having a first slope polarity representative of said occurrence of said light beam traversing the center of one of said plurality of convolutions in a first direction transverse to an elongated direction of said convolution and having a second slope polarity opposite to said first slope polarity representative of said light beam traversing the center of one of said plurality of convolutions in a direction opposite to said first transverse direction;
    means for generating a signal pulse when said tracking error signal crosses a zero reference voltage level;
    differentiator means for providing a signal output indicative of the slope polarity of said tracking error signal;
    means for providing a count of the number of convolutions to be traversed by said light beam when said light beam is repositioned from a first tracking position to a second tracking position wherein said first and second tracking positions correspond to said light beam reading information from first and second convolutions respectively, said count being equal to the number of track convolutions between said first tracking position and said second tracking position;
    means for establishing radial relative motion between said light beam and said record medium; and
    means for counting said signal pulses to thereby indicate said occurrences of said light beam traversing said convolutions during said relative motion.

7. The apparatus in accordance with claim 6 wherein said counting means includes an up/down counter and wherein said signal pulses generated while said differentiator means signal output indicates said first slope polarity of said tracking error signal enable said counter such that said counter counts up and said signal pulses generated while said differentiator means signal output indicates said second slope polarity of said tracking error signal enable said counter such that said counter counts down.

* * * * *